INVENTORS
JOHN LEWIS EDWIN BALDWIN
PETER WILLIAM BLAXTAN
BY Kane and Nydick
ATTORNEYS Feb. 20, 1968 J. L. E. BALDWIN ETAL 3,370,282

ABRASION RESISTANT MAGNETIC HEAD

Filed Jan. 3, 1964 3 Sheets-Sheet 2

INVENTORS
JOHN LEWIS EDWIN BALDWIN
PETER WILLIAM BLAXTAN

BY Hane and Nydick
ATTORNEYS

INVENTORS
JOHN LEWIS EDWIN BALDWIN
PETER WILLIAM BLAXTAN
BY Hane and Nydick
ATTORNEYS United States Patent Office 3,370,282
Patented Feb. 20, 1968

3,370,282
ABRASION RESISTANT MAGNETIC HEAD

John Lewis Edwin Baldwin, Croydon, Surrey, and Peter William Blaxtan, Bexley, Kent, England, assignors to Rank-Bush Murphy Limited, London, England, a company of Great Britain Filed Jan. 3, 1964, Ser. No. 335,527
Claims priority, application Great Britain, Jan. 7, 1963, 673/63
5 Claims. (Cl. 340—174.1)

ABSTRACT OF THE DISCLOSURE

A magnetic transducer head formed by two annular ferromagnetic circuits each interrupted by a gap of given length and pole pieces of hard highly permeable material disposed between said circuits. The pole pieces define a working gap which is shorter than the gaps defined by the circuits and aligned therewith and which has on at least one of its faces a layer of non-magnetic material. The winding coil of the head is positioned about the circuits, generally diametrically opposite to the gaps therein.

Figure 1:
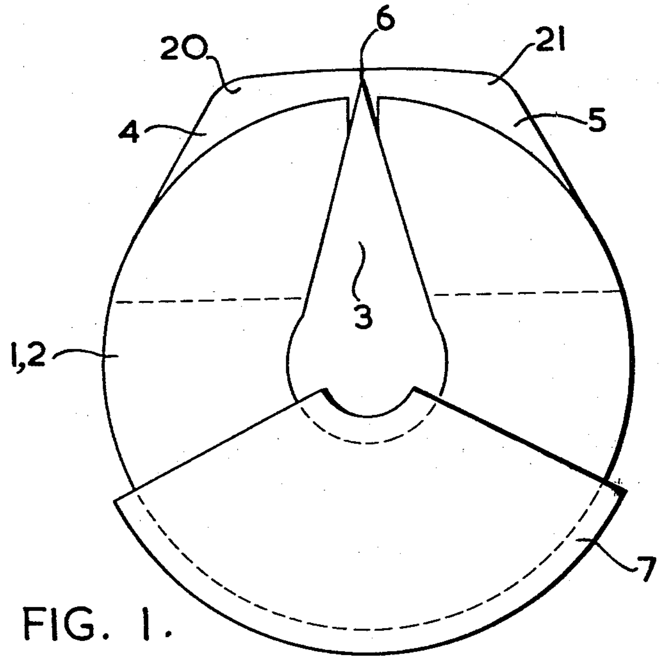

This invention relates to magnetic transducer heads, that is, to those devices comprising a gapped ferromagnetic core encompassed by an insulated winding of wire by which signals are recorded upon or reproduced from a magnetisable record medium, such as a magnetic tape or drum. It is usual for transducer heads of this type to include a core member constructed of a relatively soft, highly-permeable ferromagnetic material cooperating with pole pieces formed of a harder ferromagnetic material which resists the abrasive action of the record medium for a longer period than would the softer material of the core. In conventional head structures a gapped annulus, usually of a ferrite material, has applied to one side of it a pair of pole pieces separated only by the thickness of a fine platinum foil which forms the working gap.

It is an object of the present invention to provide a magnetic transducer head having advantageous magnetic properties as compared with known devices.

It is a further object of the invention to provide a magnetic transducer head offering advantages in ease of manufacture.

It is an ancillary object of the invention to provide a magnetic transducer head which is capable of substantially increased working life as compared with conventional devices.

In its simplest form a magnetic transducer head according to the present invention comprises two similar ferromagnetic members each having the form of an annulus interrupted by a gap of a given length and being generally symmetrical about an axis. These two ferromagnetic members are disposed coaxially and spaced upon said axis to accept between them pole pieces formed of a ferromagnetic material more resistant to abrasion than said annular members. These pole pieces have faces defining a working gap having a length less than said given length. This working gap is defined by a non-magnetic member or coating in contact with said gap-defining end faces of said pole pieces.

The gap-defining non-magnetic member may conveniently be a coating of material applied to an end face of one of said pole pieces.

In an advantageous construction of magnetic transducer head according to the invention the working gap is formed between individual pole pieces of hard, highly permeable material which are arranged to be capable of relative movement along defined paths and to be resiliently urged together at said gap and to be so formed as to form at said gap a magnetic circuit of which the form remains substantially unchanged as said pole pieces wear in operation.

Figure 2:
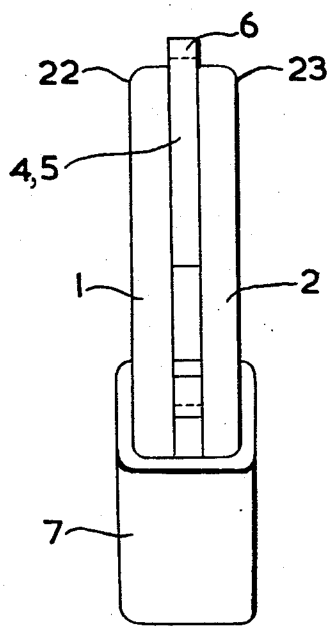
Figures 3, 4, 5:
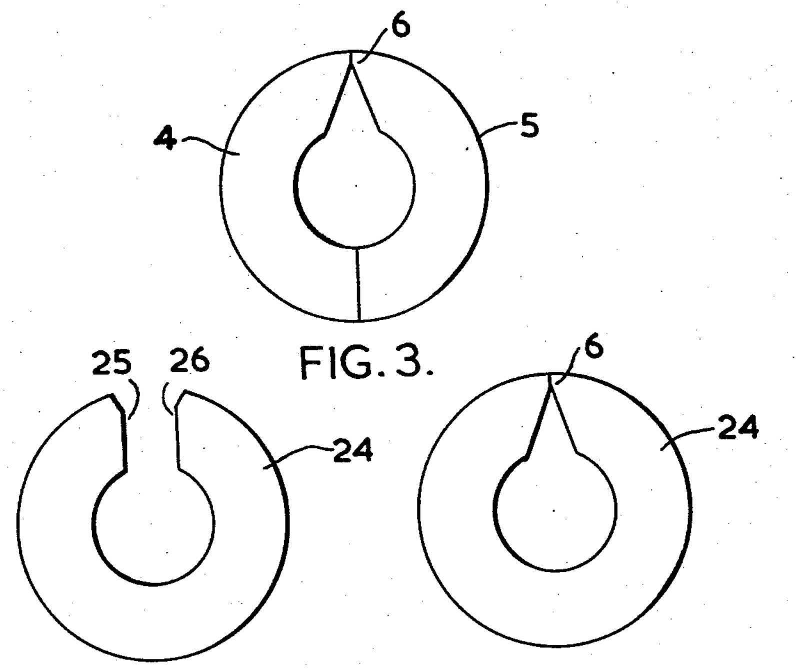
Figure 6:
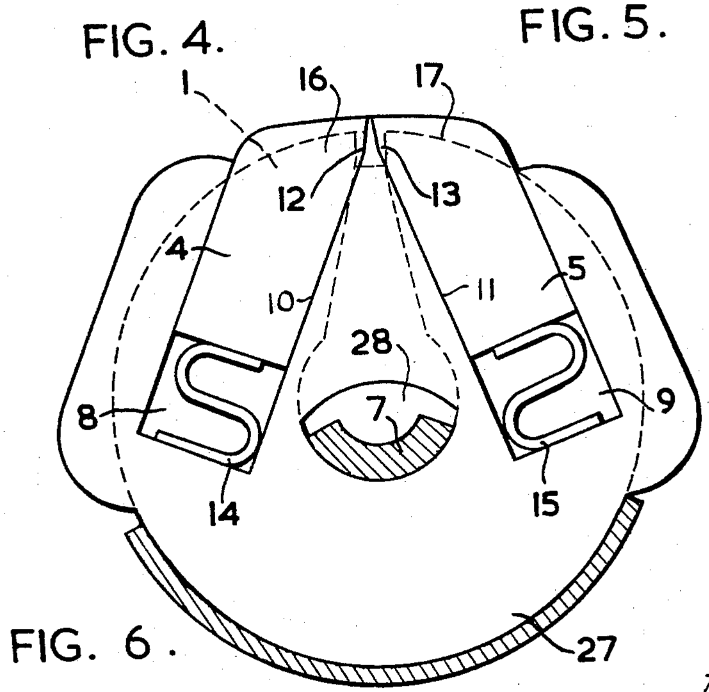
Figure 7:
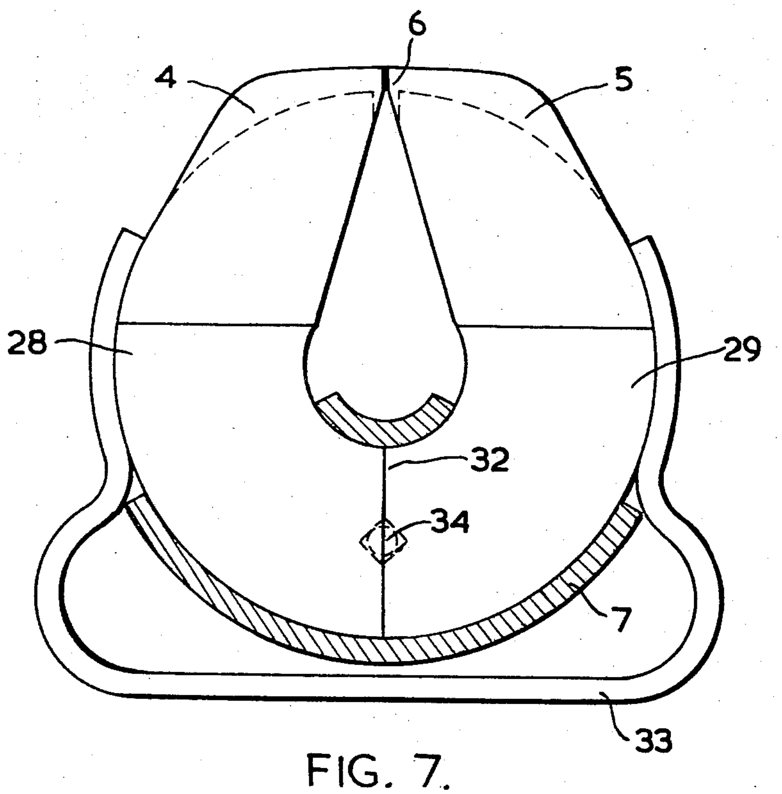
Figure 8:
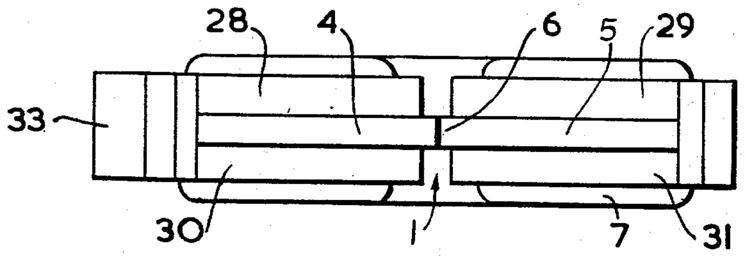

The features of the invention which are believed to be novel are recited with particularity in the appended claims. The invention, together with further features and advantages thereof, is best understood from the following description taken in conjunction with the accompanying drawings, in the several figures of which like elements are denoted by like reference numerals and in which:

FIGURE 1 is a side elevation of an embodiment of a magnetic transducer head according to the present invention, FIGURE 2 is an end elevation of the magnetic transducer head shown in FIGURE 1, FIGURE 3 shows an alternative form of pole pieces such as may be used to replace those illustrated in FIGURES 1 and 2, FIGURES 4 and 5 illustrate two stages in the formation of another form of pole-piece members suitable for use in a magnetic transducer head according to the present invention, FIGURE 6 shows a view of an alternative arrangement of pole piece members which may be used in a magnetic transducer head according to the present invention, FIGURE 7 shows a partly sectional view of an alternative embodiment of magnetic transducer head according to the invention from which one element has been removed for clarity in illustration, and FIGURE 8 shows a plan view of the transducer head illustrated in FIGURE 7.

The transducer head shown in FIGURES 1 and 2 comprises two annuli 1, 2 of a highly permeable material, such as a suitable ferrite well known in the art. Annuli 1, 2 are gapped at 3 and are disposed coaxially with one another. A pair of pole pieces 4, 5 formed of a harder, highly permeable material, conveniently that known under the trade name Alphenol are secured between annuli 1, 2 by a suitable adhesive such as an epoxy resin adhesive. Between pole pieces 4, 5 there is a non-magnetic working gap defined by a foil or coating 6 of a suitable material, placed between the gap-bounding faces of pole tips 4, 5 and conveniently secured to or formed upon one of them. Around the lower part of annuli 1, 2 is placed a winding 7 of insulated wire which links with the core to form an electromagnetic transducer head. In operation the assembly described must be appropriately held and supported in operative relation with a magnetic record medium. The arrangements necessary for this purpose may be conventional and do not concern the present invention. Preferably, those corners of the pole pieces which engage the record medium are rounded-off as shown at 20, 21 in FIGURE 1 and preferably also the circular outer edges of annuli 1, 2 are rounded-off as shown in FIGURE 2 at 22, 23.

It is not necessary, in carrying out the present invention for the pole pieces to have the forms shown in FIGURES 1 and 2. It may be found convenient for the two members taken together to form a substantially complete annulus, as illustrated in FIGURE 3, where pole pieces 4, 5 are seen to form between them a substantially complete annulus.

Alternatively it would be possible for a single member formed of an appropriate hard, highly-permeable material and initially having the form of an open ring, as shown at 24 in FIGURE 4, to have its ends finished to form appropriate gap-bounding surfaces as shown at 25, 26 and, after a gap-defining member 6 has been applied to one gap-bounding surface as shown, to be forced to assume the shape of a closed ring as illustrated in FIGURE 5.

FIGURE 6 shows an alternative arrangement which combines with the improved magnetic performance of the structures already described those of increased working life with substantially unaltered magnetic performance. Here pole pieces 4, 5 are positioned in slots 8, 9 in a non-magnetic guide member 27. These slots are inclined to one another so that their adjacent faces 10, 11 would, if produced, meet in a point below the meeting of the gap-defining faces 12, 13 of the pole pieces, which are inclined to each other at an angle less than the angle of inclination to one another of said slots. Thus as working faces 16, 17 of pole pieces 4, 5 are worn away in use, the pole pieces are urged out of slots 8, 9 by springs 14, 15 to keep the working faces always at substantially the same distance above the periphery of the ferrite rings 1, 2 (of which ring 1 only is shown in this figure).

It will be seen that guide member 27 is pierced by a central aperture 28 through which passes the winding 7 around annuli 1, 2.

In the embodiment of the invention illustrated in FIGURES 7 and 8 two magnetic circuits of generally annular form are each composed of a pair of semi-annular portions, 28, 29, and 30, 31 respectively, meeting at the working gap, of which the length is defined by a non-magnetic foil 6 in a diametrically opposite planar joint 32. Each of two adjacent portions are secured to intervening pole pieces 4, 5 respectively and the divided assembly is held together by a spring member 33 of which the limbs embrace the sides of the core. Alignment of the portions forming an annulus may be ensured by appropriate means such for example as a ball 34 engaging in recesses in the portions of the circuit.

We claim:

1. A magnetic transducer head comprising, in combination: two similar ferromagnetic members each having the form of an annulus interrupted by a gap of a given length and being generally symmetrical about an axis, said members being disposed coaxially and spaced upon said axis with said gaps aligned, pole pieces formed of a ferromagnetic material more resistant to abrasion than said annular members disposed between said ferromagnetic members, said pole pieces having faces defining a working gap having a length less than said given length and contained at least partly within the gaps defined by said members, a non-magnetic member in contact with said gap-defining faces of said pole pieces, and a coil winding positioned about said ferromagnetic members.

2. A magnetic transducer head according to claim 1 wherein said pole pieces are of similar form and together form a substantially complete annulus.

3. A magnetic transducer head according to claim 1 wherein said pole pieces are combined into a single substantially closed ring.

4. A magnetic transducer head comprising, in combination: two similar ferromagnetic members each having the form of an annulus interrupted by a gap of a given length and being generally symmetrical about an axis, said members being disposed coaxially with said gaps aligned and spaced upon said axis; a guide member disposed between said ferromagnetic members, said guide member comprising slots being inclined to one another so as to intersect at an outer surface of said annular members; two ferromagnetic pole pieces formed of a material more resistant to abrasion than said annular members mounted in said slots for longitudinal movement therein; spring members individually urging each of said pole pieces outwardly of the respective one of said slots, said pole pieces having with gap-defining faces inclined to one another at an angle which exceeds 0° but is less than the inclination to one another of said slots; a layer of non-magnetic material on at least one of said gap-defining faces; and a coil winding positioned about said ferromagnetic members.

5. A magnetic transducer head comprising, in combination: two similar ferromagnetic circuits each having the general form of an annulus interrupted by a gap of a given length and being generally symmetrical about an axis, each said circuit being formed of two portions formed for slight relative movement, said circuits being disposed coaxially with said gaps aligned and spaced upon said axis; pole pieces of harder, highly permeable material disposed between said circuits, said pole pieces having faces defining between them a working gap having a length less than said given length and being contained within said aligned gaps, said pole pieces each being secured to an axially adjacent pair of said portions; spring means urging said portions of said annuli in the direction tending to close said working gap, a non-magnetic member disposed between said pole pieces and defining the length of said working gap, and a coil winding positioned about said circuit forming portions.

References Cited

UNITED STATES PATENTS

| | | | |
|---|---|---|---|
| 3,171,903 | 3/1965 | Wheeler et al. | 179—100.2 |
| 2,917,589 | 12/1959 | Kornei | 179—100.2 |
| 2,711,945 | 6/1955 | Kornei | 346—74 |

BERNARD KONICK, *Primary Examiner.*

A. I. NEUSTADT, *Assistant Examiner.*